(12) United States Patent
Somanath et al.

(10) Patent No.: US 11,722,789 B1
(45) Date of Patent: Aug. 8, 2023

(54) MULTI-CAMERA IMAGING SYSTEM SELECTING BETWEEN VISIBLE AND INFRARED VIEWS IN A VEHICLE

(71) Applicant: FORD GLOBAL TECHNOLOGIES, LLC, Dearborn, MI (US)

(72) Inventors: Nithya Somanath, Farmington Hills, MI (US); Arun Dutta, Ann Arbor, MI (US); Colleen M. Cauvet, Canton, MI (US); Collin P. Hurley, Canton, MI (US); Donald P. Bilger, Livonia, MI (US); Javier Onate, Muncie, IN (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/589,932

(22) Filed: Feb. 1, 2022

(51) Int. Cl.
| | |
|---|---|
| *H04N 23/90* | (2023.01) |
| *G06V 20/59* | (2022.01) |
| *G06V 10/764* | (2022.01) |
| *G06V 40/16* | (2022.01) |
| *G06V 20/56* | (2022.01) |

(Continued)

(52) U.S. Cl.
CPC ............ *H04N 23/90* (2023.01); *B60R 1/22* (2022.01); *G01W 1/02* (2013.01); *G05B 13/0265* (2013.01); *G06F 3/14* (2013.01); *G06V 10/764* (2022.01); *G06V 10/811* (2022.01); *G06V 20/56* (2022.01); *G06V 20/597* (2022.01); *G06V 40/176* (2022.01); *G10L 15/08* (2013.01);

(Continued)

(58) Field of Classification Search
CPC .. H04N 23/90; B60R 1/22; B60R 2300/8053; B60R 2300/20; G06V 20/56; G06V 20/597; G06V 10/764; G06V 10/811; G06V 40/176; G01W 1/02; G05B 13/0265; G06F 3/14; G10L 15/08; G10L 15/22; G10L 2015/088
See application file for complete search history.

(56) References Cited

U.S. PATENT DOCUMENTS

| | | | |
|---|---|---|---|
| 6,327,522 B1 * | 12/2001 | Kojima | B60K 35/00 701/1 |
| 7,151,439 B2 * | 12/2006 | Moisei | G01S 17/89 348/148 |

(Continued)

FOREIGN PATENT DOCUMENTS

JP 2019001325 A 1/2019

*Primary Examiner* — Boubacar Abdou Tchoussou
(74) *Attorney, Agent, or Firm* — Frank L. Lollo; MacMillan, Sobanski & Todd, LLC

(57) ABSTRACT

In order to display driving assistance images to a driver in a vehicle, visible light images are captured using a visible light camera mounted for viewing a roadway on which the vehicle travels and infrared images overlapping with the visible light images are captured using an infrared camera mounted for viewing the roadway. The visible light images are normally displayed on a display screen when a visible light brightness around the vehicle is greater than a brightness threshold. Trigger conditions are monitored which are indicative of limitations of a driver visibility when directly viewing the roadway. The trigger conditions include a driver reaction. The monitored trigger condition is classified according to a plurality of predetermined classifications which indicate an occurrence of an impairment event. The infrared images are selected for display on the display screen upon occurrence of the impairment event.

18 Claims, 4 Drawing Sheets

(51) Int. Cl.
    *G10L 15/22*         (2006.01)
    *G10L 15/08*         (2006.01)
    *G06F 3/14*          (2006.01)
    *B60R 1/22*          (2022.01)
    *G01W 1/02*        (2006.01)
    *G05B 13/02*       (2006.01)
    *G06V 10/80*       (2022.01)

(52) U.S. Cl.
    CPC .......... *G10L 15/22* (2013.01); *B60R 2300/20* (2013.01); *B60R 2300/8053* (2013.01); *G10L 2015/088* (2013.01)

(56) References Cited

U.S. PATENT DOCUMENTS

| | | | |
|---|---|---|---|
| 7,199,366 B2 * | 4/2007 | Hahn | H04N 5/33 348/E7.086 |
| 8,194,920 B2 | 6/2012 | Ebenstein et al. | |
| 9,058,706 B2 | 6/2015 | Cheng | |
| 9,083,897 B2 * | 7/2015 | Hogasten | H04N 7/181 |
| 9,798,937 B2 * | 10/2017 | Yoo | G06V 10/44 |
| 10,394,237 B2 | 8/2019 | Xu et al. | |
| 10,657,387 B2 | 5/2020 | Ji et al. | |
| 10,739,783 B2 | 8/2020 | Seo et al. | |
| 10,875,537 B1 * | 12/2020 | Brooks | G06V 20/597 |
| 2014/0285672 A1 * | 9/2014 | Hogasten | H04N 5/332 348/164 |
| 2016/0055384 A1 * | 2/2016 | Yoo | G06K 9/6201 348/148 |
| 2018/0012091 A1 * | 1/2018 | Ricci | G06Q 30/0601 |
| 2019/0243362 A1 * | 8/2019 | Hyuga | B60W 50/082 |
| 2019/0256087 A1 | 8/2019 | Kim et al. | |
| 2019/0392719 A1 | 12/2019 | Parker et al. | |
| 2021/0009140 A1 * | 1/2021 | Brooks | G06F 3/011 |
| 2021/0279514 A1 * | 9/2021 | Turcot | G06V 10/454 |
| 2021/0339759 A1 * | 11/2021 | Fouad | G06N 3/006 |
| 2022/0289249 A1 * | 9/2022 | Imai | B60W 50/14 |

\* cited by examiner

MULTI-CAMERA IMAGING SYSTEM SELECTING BETWEEN VISIBLE AND INFRARED VIEWS IN A VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to driver assistance systems using an interior display panel to show camera images directed outside a vehicle, and, more specifically, to automatic selection between overlapping visible light camera views and infrared camera views to improve visibility of the surroundings for the driver.

To enhance the ability of a driver to monitor the surroundings of a motor vehicle while driving in many different types of circumstances and environments, display panels (e.g., touchscreen displays) may be provided in the passenger cabin in view of the driver for reproducing live video feeds from cameras mounted on the vehicle to capture outwardly-directed images. In particular, the cameras can include infrared (IR) cameras (e.g., including far infrared cameras) for enhancing night vision because of their sensitivity to objects such as pedestrians and animals for example. When ambient daylight is present, the display panel may show visible light images by default. An ambient light sensor or sun load sensor mounted on the vehicle may generate a detection signal quantifying an ambient light level which can be compared to a brightness threshold for distinguishing between dark and non-dark conditions. A manual switch or other user control may be provided to enable the driver to manually select between overlapping visible and IR views.

Even when ambient daylight is present, there are situations in which an IR camera view can provide improved visibility of significant visual elements of the surroundings. For example, an IR view may be useful when glare from the Sun impairs the driver's normal view of the roadway ahead of the vehicle since the incoming solar radiation is relatively small at infrared wavelengths. Other sources of vision impairment may include condensation on the windshield, dust, fog, smoke, rain, or snow. Typical vision enhancement systems rely on manual driver activation of an IR view in order to obtain the improved visibility whenever the presence of ambient light otherwise causes selection of the visible camera view. Reliance on manual selection requires the driver to understand how the camera selection system works and to appreciate all the conditions for which it may be desirable to switch to an IR view instead of a visible light view. An automated system for selecting the IR view during appropriate conditions can provide reduced distraction, reduced cognitive load, and increased driver alertness. However, detecting the appropriate conditions using only the camera images may be generally ineffective, and other known methods for identifying the appropriate conditions may result in expensive components such as specialized sensors and high capacity computing devices.

SUMMARY OF THE INVENTION

The present invention provides automatic selection of a camera feed so that there is no need to manually select the right camera for the driving situation. Artificial intelligence, machine learning, and/or computer modeling may be used to determine the correct camera views (e.g., when to activate an IR view even during daylight conditions) for improved visibility of surrounding objects based on onboard sensor data already commonly available in vehicles, user input, and offboard (i.e., remotely obtained) information. In particular, the basis for a selection includes monitoring reactions of the driver while driving. Moreover, the automatic selection operation takes into account user preferences based on user feedback (e.g., changes in driving behavior, facial expressions, or verbal expressions).

In one aspect of the invention, a vehicle comprises a visible light camera mounted for viewing a roadway on which the vehicle travels and capturing visible light images and an infrared camera mounted for viewing the roadway and capturing infrared images overlapping with the visible light images. A display screen is visible to a driver of the vehicle and is configured to selectably display the visible light images or the infrared images in real time, wherein the visible light images are normally selected when a visible light brightness around the vehicle is greater than a brightness threshold. An impairment monitor is configured to monitor trigger conditions indicative of limitations of a driver visibility when directly viewing the roadway, wherein the trigger conditions include a driver reaction. A control circuit is configured to (A) classify the monitored trigger condition according to a plurality of predetermined classifications which indicate an occurrence of an impairment event, and (B) select the infrared images for display on the display screen upon occurrence of the impairment event.

DETAILED DESCRIPTION OF PREFERRED EMBODIMENTS

Figure 1:
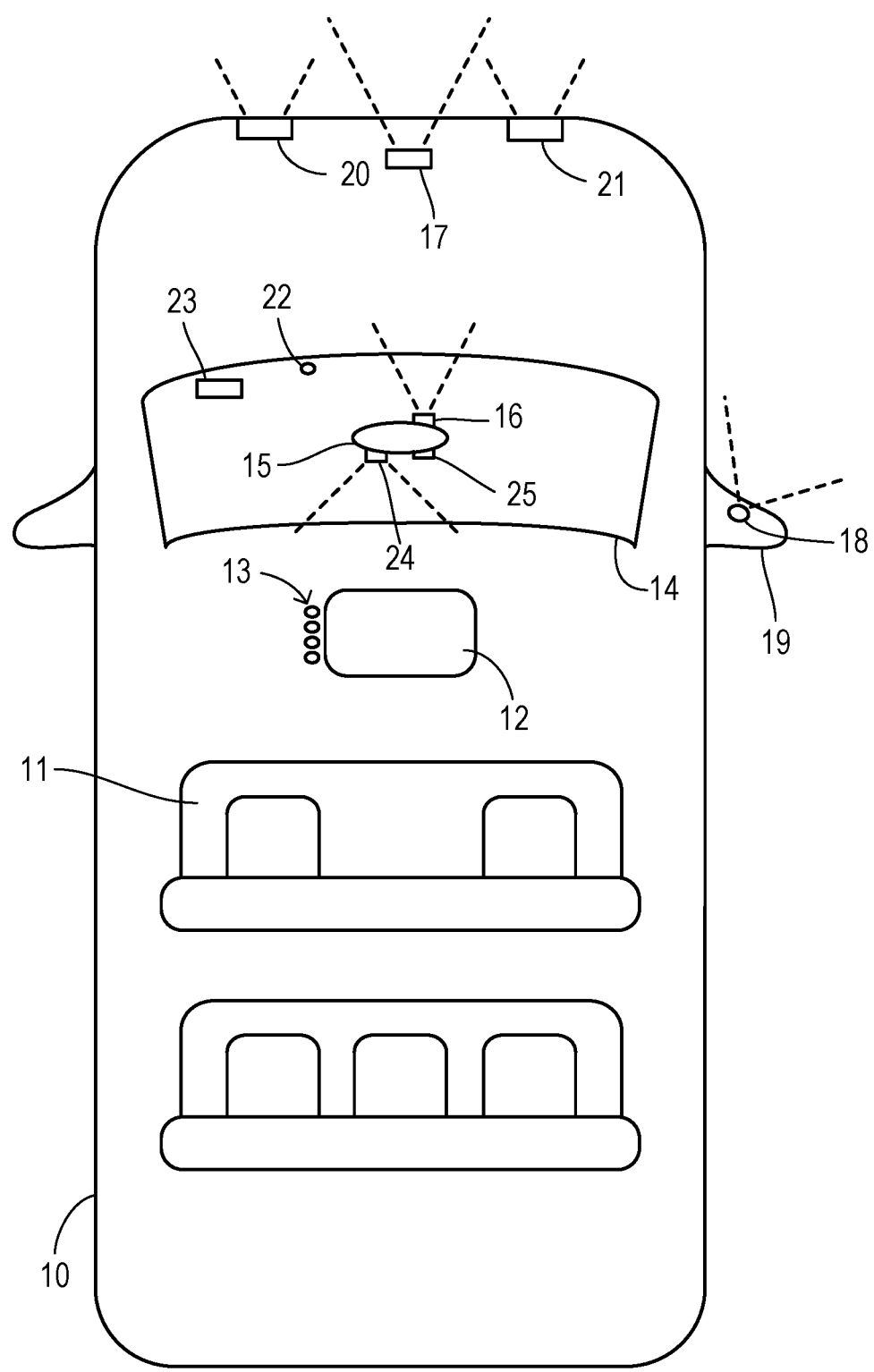
FIG. 1 is a schematic view of a passenger transportation vehicle equipped with cameras and sensors for selectably displaying infrared images on a display screen.

Referring to FIG. 1, a vehicle 10 has a driver's seat 11 from which a driver (not shown) can visually inspect a display panel 12 (e.g., a video monitor on an instrument panel or a rearview mirror unit, a heads-up display, or a display screen integrated into another assembly) which shows images from one or more cameras arranged to provide a field of view outside the vehicle for viewing a roadway on which vehicle 10 travels. The driver sees the roadway ahead through a windshield 14. User controls 13 are associated with display panel 12 in order to receive manual selection among a plurality of different camera views (e.g., selecting between visible light images and infrared images).

A visible light camera 16 is mounted on rearview mirror unit 15 for capturing visible light images. An infrared camera 17 is mounted for viewing the roadway and capturing infrared images which overlap with the visible light images. Camera 17 may be mounted on an exterior portion of vehicle 10 since most typical types of glass for windshield 14 may attenuate infrared radiation. Alternatively, infrared camera 17 can be mounted on mirror unit 15 or elsewhere in the interior if at least a portion of windshield 14 is configured to transmit infrared radiation. The visible and/or infrared images for display to the driver can alternatively be captured from other positions on vehicle 10, such as from a visible light camera 18 mounted on a sideview mirror unit 19. A visible light camera 20 and an infrared camera 21 can be mounted on a front grille portion of vehicle 10 or within headlamp unit(s), for example.

Detection of conditions wherein the visibility of a roadway and the surroundings of the vehicle may become impaired because of the state of particular environmental conditions, information from environmental sensors can be utilized. Environmental sensors may include any type of data collection such as direct measurement (e.g., an ambient light sensor (ALS) 22 and/or a condensation sensor 23 for detecting fogging of windshield 14) or obtaining offboard information from a weather service for other kinds of impairments (e.g., indicating dust or precipitation in the air). In order to monitor the driver for indications of impairments (i e, limitations) imposed on the driver's visibility for direct viewing of the roadway, an inwardly-pointed camera 24 and an interior microphone 25 are provided in the vicinity of the driver (e.g., incorporated into rearview mirror unit 15).

Figure 2:
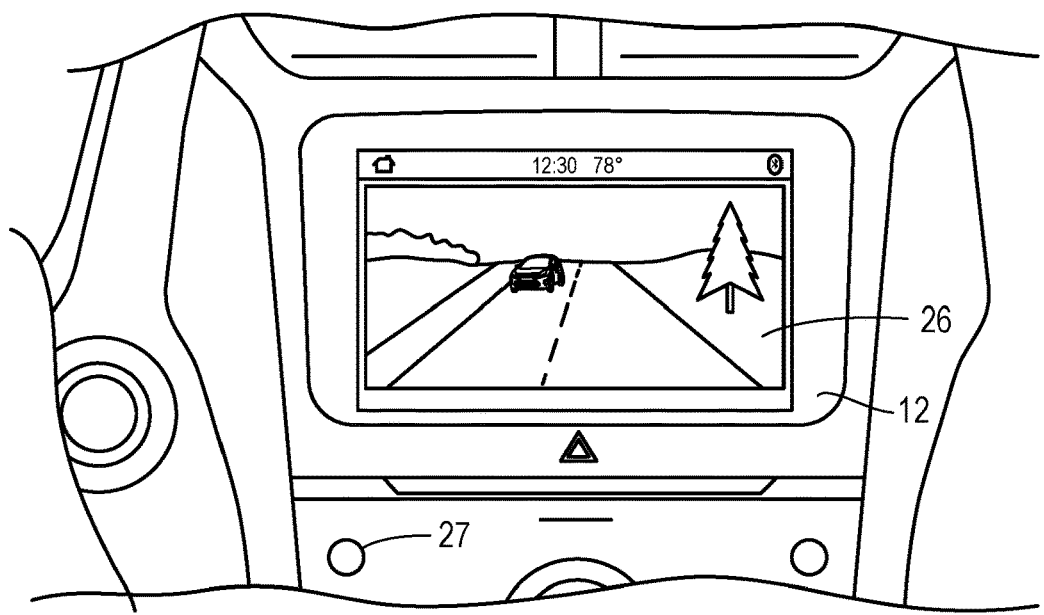
FIG. 2 is a schematic view of a display screen inside a passenger cabin.

FIG. 2 shows a video display portion 26 of display panel 12 for presenting visible light and/or infrared light (e.g., far infrared) live video images to the driver. A manual selector 27 is disposed on or near display panel 12 and is operable by the driver to manually select the infrared images of the visible light images for reproduction by video display portion 26. In some embodiments, an automatic default operation selects the images for display such that 1) the visible light images are normally selected whenever a visible light brightness around the vehicle (e.g., as determined using ALS 22 shown in FIG. 1) is greater than a predetermined brightness threshold, and 2) the infrared images are normally selected whenever the visible light brightness is less than the predetermined brightness threshold. The brightness threshold has a value which is adapted to differentiate between well lit situations (e.g., daylight, nighttime city driving, or other non-dark conditions) and poorly lit situations (e.g., nighttime rural driving or other dark conditions).

Figure 3:
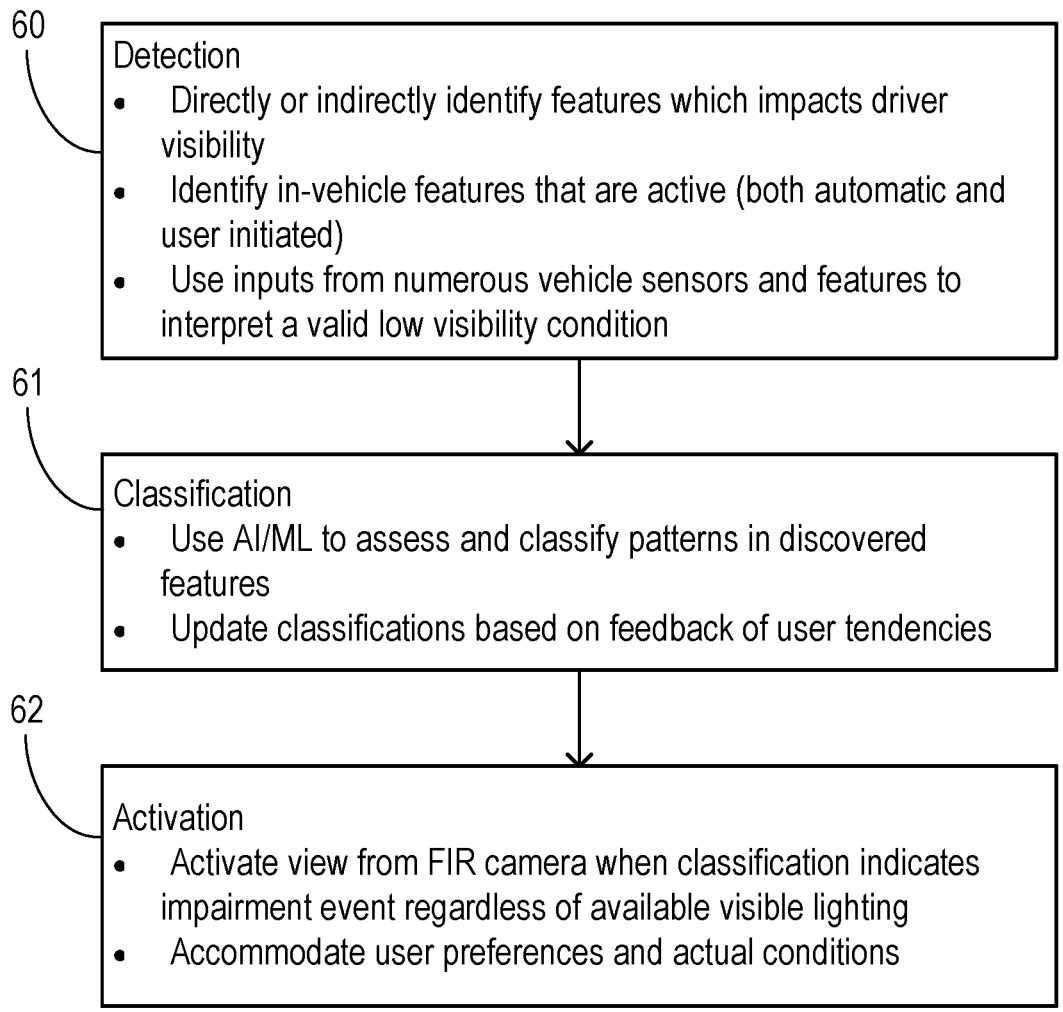
FIG. 3 is a flow diagram showing main elements of a process according to a preferred embodiment.

Three main aspects of a preferred embodiment for logic used to automatically select infrared images for viewing under non-dark lighting conditions when they would provide improved visibility over visible light images are shown in FIG. 3. In a detection block 60, various factors which impact driver visibility are detected. The detection directly or indirectly identifies potential trigger conditions that may be used to indicate limitations impacting driver visibility of the kind that can be improved using an infrared view. This can involve identification of vehicle features which are active such as a window defrost function (indicating window fogging) or a windshield wiper (indicating precipitation). Alternatively or additionally, it can involve use of onboard and offboard sensors which can be used to identify other low visibility conditions cause by other impairments or limitations. These include driver behaviors which can reveal that the driver is experiencing impairment of the ability to see the desired surroundings in visible light.

In a classification block 61, the detected trigger conditions are classified according to whether their current status identifies the occurrence of an impairment event, which should invoke a change to an infrared view for the particular driver of the vehicle. The classification can utilize known techniques involving artificial intelligence and/or machine learning which can be used to establishing a baseline classification regime and to optionally modify the classification regime for each particular driver according to feedback of user tendencies or preferences in order to refine the detection of impairment event. The driver tendencies or preferences can be indicated by their pattern of manual selections between the visible light and infrared views under various conditions (e.g., environmental conditions and states of vehicle features).

In an activation block 62, whenever the above classification identifies a driver reaction or other trigger condition which has a classification matching an impairment event associated with improved view using infrared then the infrared images from an infrared camera are selected for display. Consequently, activation of the infrared view can take into consideration the actual conditions affecting visibility as well as the user's preferences.

Figure 4:
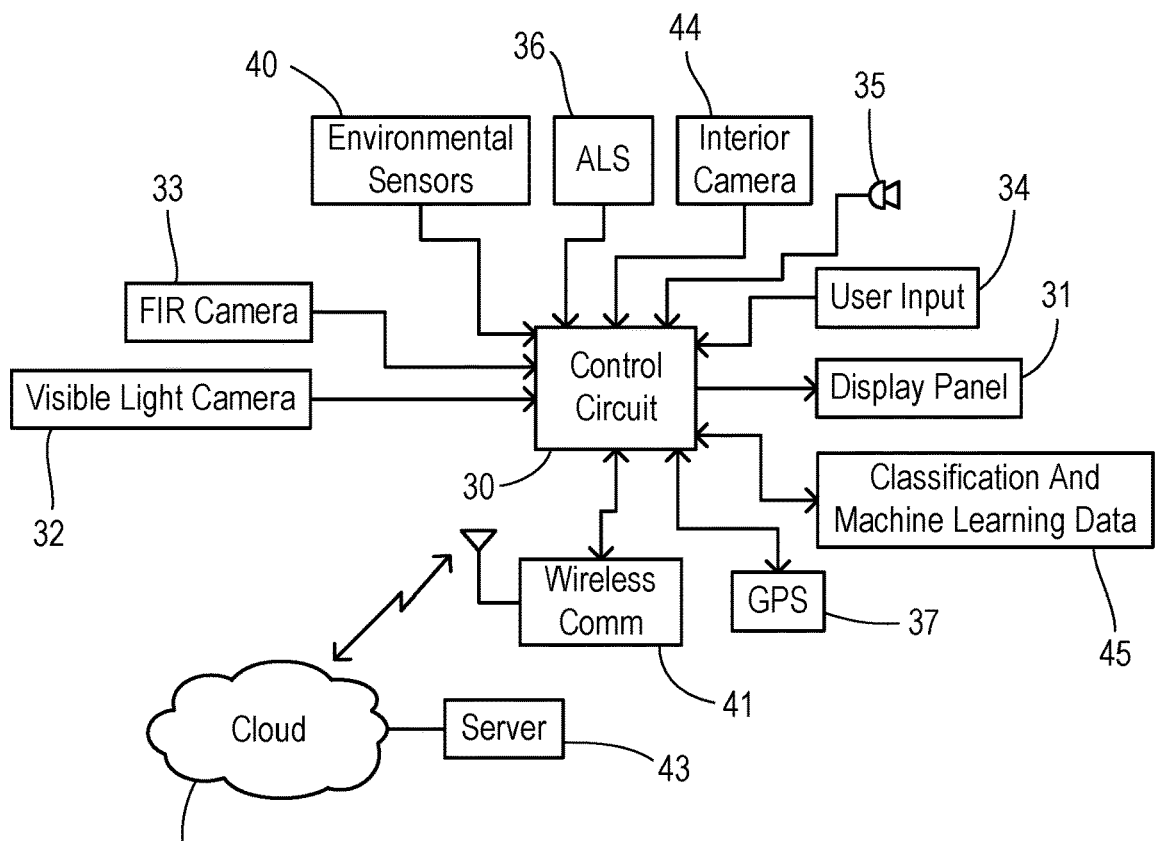
FIG. 4 is a block diagram showing components in a vehicle according to a preferred embodiment.

FIG. 4 shows apparatus according to a preferred embodiment of the invention. A main control circuit 30 is configured to execute program(s) according to the various aspects of the invention. Control circuit 30 (also referred herein to as controller 30) may be comprised of a programmable computing device (e.g., microcontroller) in an electronics module within a vehicle, such as a body control module (BCM), or can be spread across two or more modules communicating within the vehicle. Controller 30 is coupled to a display panel 31 in order to supply selected visible light or infrared images that have been captured by a visible light camera 32 and a far infrared (FIR) camera 33 which are coupled to controller 30. A user input 34 (which may be comprised of a control element or switch) provides a manual selection signal to controller 30 so that the driver can manually control which type of image is displayed. Alternatively or additionally, a user's selection can be generated based on spoken commands received via an interior microphone 35.

An ambient light sensor (ALS) 36 uses a photodetector to measure a brightness level outside the vehicle, enabling the visible light camera view to be selected by default whenever the brightness is above a threshold and the infrared camera view to be selected whenever the brightness is below the threshold.

Conditions which may automatically trigger a change to the selected camera view (e.g., depending upon the current state or values of the conditions) can be monitored using several modalities (collectively referred to as impairment monitoring). Interior microphone 35 and an interior camera 44 monitor trigger conditions related to driver reactions (e.g., behaviors performed in response to impairments of the driver's ability to see in visible light). An exterior microphone and/or exterior camera can also be utilized as appropriate. A plurality of onboard environmental sensors 40 monitor other potential trigger conditions as described below. A global positioning system (GPS) receiver 37 or other geolocation system provides a present location of the vehicle to controller 30 to facilitate the selection of offboard information which characterizes potential trigger conditions such as precipitation (rain or snow) and dust. Using the vehicle location, offboard messages can be exchanged between controller 30 and a remote data server 43 via a wireless communication module 41 and a cloud network 42, for example. Wireless communication module 41 may be comprised of a cellular data modem, or a V2V or a V2X transceiver, for example.

Controller 30 includes or is coupled to a classification database 45, and is configured to perform tasks including 1)

classifying a monitored trigger condition according to a plurality of predetermined classifications which indicate an occurrence of an impairment event, and 2) generating additional classifications or updated classification for use in detecting future impairment events based on a value of an environmental parameter when the initiates a manual selection of the infrared view. Some of the trigger conditions and classifications of the trigger conditions leading to detection of an impairment event include the following examples.

Based on using an impairment monitor comprised of interior camera 44 to capture images of the driver, the trigger conditions can be comprised of driver reaction poses. The poses may be facial affectations, mannerisms, physical movements, or gestures wherein particular poses are classified as being associated with the existence of impairment/limitations of driver visibility which can be addressed by switching to the infrared view. The classified facial affectations can be comprised of squinted eyes, or a furrowed brow and gestures may include lifting a hand near the forehead while attempting to block sunglare, for example. Thus, controller 30 may use facial recognition, AI pattern matching, and/or analytic models (predefined and/or modified using machine learning) to detect a driver reaction which is indicative of the need to switch to the infrared view.

Based on using an impairment monitor comprised of interior microphone 35 to capture sounds in the passenger cabin, the trigger conditions can be comprised of driver reactions in the form of utterances of the driver. The utterances may be comprised of spoken keywords, phrases, expressions, or even vocal tone or character (e.g., a rising pitch showing emotional stress). Classifications of the utterances may include predetermined classified phrases such as "difficult to see," "too bright," "cannot see," or "turn on window defrost," and classified keywords such as "foggy," "rain," "gloomy," "glare," or the like.

Based on using an impairment sensor comprising an environmental sensor 40, the trigger conditions may further include an environmental parameter which is detected by the environmental sensor. For example, the environmental parameter may a fogged windshield, atmospheric fog, atmospheric dust, or atmospheric precipitation (e.g., rain, snow, sleet). Thus, sensor 40 may be comprised of a window fogging sensor such as a condensation sensor or an integrated dew point and glass temperature sensor. Impairment monitoring by environmental sensor 40 may alternatively include manual or automatic setting of various vehicle accessories such as an automatic window defroster.

Exterior cameras 32/33 may also be utilized as impairment monitors. For example, they may have the capability to provide images for detecting precipitation, an icy roadway, or other weather-related trigger conditions. Camera images may indicate obstacles that may be difficult to see in visible light because of distance or aspects of the ambient light.

Figure 5:
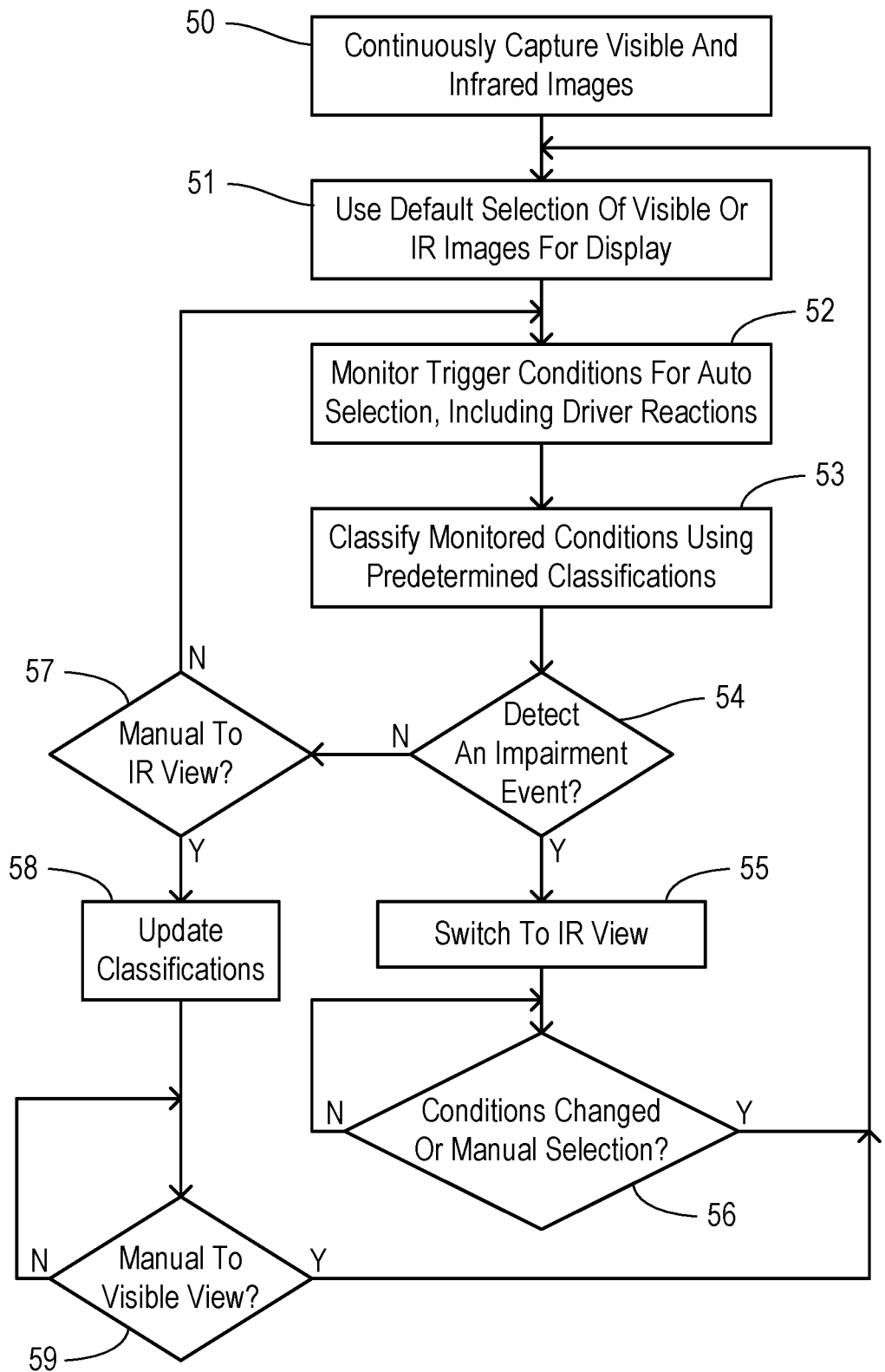
FIG. 5 is a flowchart showing one preferred method of the invention.

FIG. 5 shows a method of the invention wherein visible and infrared images are continuously captured in step 50. In step 51, a default selection is used for choosing either visible or infrared images for display to the driver. The method monitors for trigger conditions in step 52, wherein impairment monitoring of the trigger conditions support automatic selection of an infrared view for the display and wherein the trigger conditions include driver reactions.

In step 53, the monitored conditions are classified using predetermined classifications which identify instances of the trigger conditions which are correlated with an impaired visibility of the driver in visible light, wherein visibility can be enhanced by presenting an infrared view on the display panel. In step 54, the classifications are checked to determine whether an impairment event has been detected. If so, then the display panel screen is automatically switched to an infrared view in step 55. In step 56, a check is performed to determine whether the conditions have changed or whether the driver has entered a manual selection to return to the visible light view. If not, then step 56 is repeated. If yes, then a return is made to step 51 where a default selection is again made and then trigger conditions continue to be monitored. Whenever a manual selection is detected in step 56, classifications in the classification database can be updated to take into account the user's feedback in such a way that when the same set of conditions occurs in the future then an impairment event (or a lack thereof) can be detected automatically.

If an impairment event is not detected in step 54, then a check is performed in step 57 to determine whether the driver made a manual switch to the infrared view. If not, then a return is made to step 52 for ongoing monitoring of the trigger conditions. If a manual change to the infrared view is detected in step 57, then the predetermined classifications in a classification database for the particular driver may be updated accordingly in step 58. Thus, occurrence of the user's manual selection is employed as feedback in order to modify the classification database to automatically instantiate similar changeovers in the future if and when the same environmental conditions recur. After updating the classifications in step 58, a check is performed in step 59 to determine whether the driver initiates a manual selection to return to the visible light view. Once such a manual selection is made (or the vehicle is turned off), then the method returns to step 51 to resume using the default selection and then ongoing monitoring of the trigger conditions resumes.

What is claimed is:

1. A vehicle comprising:
 a visible light camera mounted for viewing a roadway on which the vehicle travels and capturing visible light images;
 an infrared camera mounted for viewing the roadway and capturing infrared images overlapping with the visible light images;
 a display screen visible to a driver of the vehicle and configured to selectably display the visible light images or the infrared images in real time, wherein the visible light images are normally selected when a visible light brightness around the vehicle is greater than a brightness threshold;
 an impairment monitor configured to monitor trigger conditions indicative of limitations of a driver visibility when directly viewing the roadway, wherein the trigger conditions include driver reaction poses; and
 a control circuit configured to (A) classify the monitored driver reaction poses according to a plurality of predetermined pose classifications which indicate an occurrence of an impairment event, and (B) select the infrared images for display on the display screen upon occurrence of the impairment event based on the classifying of the driver reaction poses;
 wherein the impairment monitor is comprised of an interior camera capturing images of the driver to obtain the driver reaction poses.

2. The vehicle of claim 1 wherein the driver reaction poses are comprised of a facial affectation or a mannerism.

3. The vehicle of claim 2 wherein the facial affectation is comprised of squinted eyes or a furrowed brow.

4. The vehicle of claim 1 wherein the impairment monitor is further comprised of a microphone detecting sound from the driver, wherein the trigger conditions are further comprised of utterances which are classified according to limitations of the driver visibility, wherein the control circuit is further configured to classify the monitored utterances according to a plurality of predetermined utterance classifications which indicate an occurrence of an impairment event, and wherein the control circuit is further configured to select the infrared images for display on the display screen upon occurrence of the impairment event.

5. The vehicle of claim 4 wherein the utterances are classified by the control circuit according to predetermined keywords, phrases, or expressions.

6. The vehicle of claim 1 further comprising an environmental sensor, wherein the trigger conditions further include an environmental parameter which is detected by the environmental sensor, and wherein the control circuit is further configured to select the infrared images for display on the display screen upon detection of the environmental parameter.

7. The vehicle of claim 6 wherein the environmental parameter indicates a fogged windshield, atmospheric fog, atmospheric dust, or atmospheric precipitation.

8. The vehicle of claim 6 wherein the control circuit uses machine learning based on a value of the environmental parameter when the control circuit detects the occurrence of the impairment event based on the driver reaction to generate an additional classification for use by the control circuit to detect future impairment events.

9. The vehicle of claim 1 further comprising:
an environmental sensor, wherein the trigger conditions further include an environmental parameter which is detected by the environmental sensor, wherein the control circuit is further configured to select the infrared images for display on the display screen upon detection of the environmental parameter; and
a manual selector coupled to the control circuit operable by the driver to override the control circuit and to manually select display of the infrared images or the visible light images;
wherein the control circuit uses machine learning based on a value of the environmental parameter when the driver manually selects the display of the infrared images to generate an additional classification for use by the control circuit to detect future impairment events.

10. A method of displaying driver assistance images to a driver in a vehicle, comprising the steps of:
capturing visible light images using a visible light camera mounted for viewing a roadway on which the vehicle travels;
capturing infrared images overlapping with the visible light images using an infrared camera mounted for viewing the roadway;
normally displaying on a display screen, the visible light images when a visible light brightness around the vehicle is greater than a brightness threshold;
monitoring trigger conditions indicative of limitations of a driver visibility when directly viewing the roadway including capturing images of the driver using an interior camera, wherein the trigger conditions include driver reaction poses;
classifying the monitored driver reaction poses according to a plurality of predetermined pose classifications which indicate an occurrence of an impairment event; and
selecting the infrared images for display on the display screen upon occurrence of the impairment event based on the classifying of the driver reaction poses.

11. The method of claim 10 wherein the driver reaction poses are comprised of a facial affectation or a mannerism.

12. The method of claim 11 wherein the facial affectation is comprised of squinted eyes or a furrowed brow.

13. The method of claim 10 wherein the step of monitoring trigger conditions is further comprised of a detecting utterances from the driver, and wherein the method further comprises the steps of:
classifying the monitored utterances according to a plurality of predetermined utterance classifications which indicate an occurrence of an impairment event according to limitations of the driver visibility; and
selecting the infrared images for display on the display screen upon occurrence of the impairment event.

14. The method of claim 13 wherein the utterances are classified according to predetermined keywords, phrases, or expressions.

15. The method of claim 10 wherein the vehicle includes an environmental sensor, wherein the trigger conditions further include an environmental parameter which is detected by the environmental sensor, and wherein the method further comprises the step of:
selecting the infrared images for display on the display screen upon detection of the environmental parameter.

16. The method of claim 15 wherein the environmental parameter is classified according to a fogged windshield, atmospheric fog, atmospheric dust, or atmospheric precipitation.

17. The method of claim 15 further comprising the step of:
using machine learning based on a value of the environmental parameter when the occurrence of the impairment event is detected based on the driver reaction to generate an additional classification for use in detecting future impairment events.

18. The method of claim 10 wherein the vehicle includes an environmental sensor and a manual selector, wherein the trigger conditions further include an environmental parameter which is detected by the environmental sensor, wherein the manual selector is operable by the driver to manually select display of the infrared images or the visible light images, and wherein the method further comprises the steps of:
selecting the infrared images for display on the display screen upon detection of the environmental parameter; and
using machine learning based on a value of the environmental parameter when the driver manually selects the display of the infrared images to generate an additional classification for use in detecting future impairment events.

* * * * *